US010572798B2

(12) United States Patent
Wang et al.

(10) Patent No.: US 10,572,798 B2
(45) Date of Patent: *Feb. 25, 2020

(54) DUELING DEEP NEURAL NETWORKS (71) Applicant: DeepMind Technologies Limited, London (GB)

(72) Inventors: Ziyu Wang, St Albans (GB); Joao Ferdinando Gomes de Freitas, London (GB); Marc Lanctot, London (GB)

(73) Assignee: DeepMind Technologies Limited, London (GB)

(*) Notice: Subject to any disclaimer, the term of this patent is extended or adjusted under 35 U.S.C. 154(b) by 552 days.

This patent is subject to a terminal disclaimer.

(21) Appl. No.: 15/349,900

(22) Filed: Nov. 11, 2016

(65) Prior Publication Data
US 2017/0140266 A1 May 18, 2017

Related U.S. Application Data
(60) Provisional application No. 62/254,684, filed on Nov. 12, 2015.

(51) Int. Cl.
*G06N 3/04* (2006.01)
*G06N 3/02* (2006.01)
*G06N 3/08* (2006.01)

(52) U.S. Cl.
CPC .......... *G06N 3/0472* (2013.01); *G06N 3/02* (2013.01); *G06N 3/0454* (2013.01); *G06N 3/08* (2013.01); *G06N 3/088* (2013.01); *Y04S 10/54* (2013.01)

(58) Field of Classification Search
CPC ...... G06N 3/0472; G06N 3/02; G06N 3/0454; G06N 3/08; G06N 3/088; Y04S 10/54
(Continued)

(56) References Cited

U.S. PATENT DOCUMENTS

| 5,608,843 A | 3/1997 | Baird, III |
| 8,447,706 B2 * | 5/2013 | Schneegaß ............. G06F 11/00 706/12 |

(Continued)

OTHER PUBLICATIONS

Mnih et al "Playing Atari with Deep Reinforcement Learning" arXiv 1312.5602, Dec. 2013, 9 pages.
(Continued)

*Primary Examiner* — Shane D Woolwine
(74) *Attorney, Agent, or Firm* — Fish & Richardson P.C.

(57) ABSTRACT

Systems, methods, and apparatus, including computer programs encoded on a computer storage medium, for selecting an actions from a set of actions to be performed by an agent interacting with an environment. In one aspect, the system includes a dueling deep neural network. The dueling deep neural network includes a value subnetwork, an advantage subnetwork, and a combining layer. The value subnetwork processes a representation of an observation to generate a value estimate. The advantage subnetwork processes the representation of the observation to generate an advantage estimate for each action in the set of actions. The combining layer combines the value estimate and the respective advantage estimate for each action to generate a respective Q value for the action. The system selects an action to be performed by the agent in response to the observation using the respective Q values for the actions in the set of actions.

20 Claims, 3 Drawing Sheets

(58) Field of Classification Search
USPC .......................................................... 706/17
See application file for complete search history.

(56) References Cited

U.S. PATENT DOCUMENTS

| | | | | |
|---|---|---|---|---|
| 2015/0100530 A1* | 4/2015 | Mnih | ................... | G06N 3/0454 706/25 |
| 2016/0155049 A1* | 6/2016 | Choi | ...................... | G06N 3/082 706/16 |

OTHER PUBLICATIONS

Wang et al., "Dueling network architectures for deep reinforcement learning," arXiv preprint arXiv:1511.06581v1, Nov. 20, 2015, 14 pages.

Wang et al., "Dueling network architectures for deep reinforcement learning," arXiv preprint arXiv:1511.06581v2, Jan. 8, 2016, 16 pages.

Wang et al., "Dueling network architectures for deep reinforcement learning," arXiv preprint arXiv:1511.06581v3, Apr. 5, 2016, 15 pages.

International Search Report and Written Opinion in International Application No. PCT/US2016/061702, dated Feb. 23, 2017, 15 pages.

Van Hassell et al. "Deep Reinforcement Learning with Double Q-learning," Sep. 22, 2015, arXiv preprint arXiv 1509.06461v1, 12 pages.

Van Hassell et al. "Double Q-learning," Advances in Neural Information Processing Systems 23 C, Dec. 6, 2010, Retrieved from the Internet: URL:https://papers.nips.cc/paper/3964-double-q-learning.pdf> [retrieved on Dec. 6, 2010] 9 pages.

Weiring: "Q([lambda])—learning: A New On-policy Reinforcement Learning Algorithm," Proceedings of the 7$^{th}$ European Workshop on Reinforcement Learning, Jan. 1, 2005, Retrieved from the Internet: URL<http://www.ai.rug.nl/~mwiering/grou/ARTICLES/QV_learning_ewrl.pdf [retrieved on Feb. 14, 2017] 2 pages.

Ba et al. "Multiple object recognition with visual attention," arXiv prepreint arXiv1412.7755v2, Apr. 23, 2015, 10 pages.

Baird. "Advantage updating," Technical Report WL-TR-93/1146, Wright-Patterson Air Force Base, Nov. 1993, 47 pages.

Bellemare et al. "The arcade learning environment: An evaluation platform for general agents," Journal of Artificial Intelligence Research, vol. 47, Jun. 2013, 27 pages.

Bellemare et al. "Increasing the action gap: New operators for reinforcement learning," AAAI, Feb. 12, 2016, 8 pages.

Bengio et al. "Advances in optimizing recurrent networks," ICASSP, May 26, 2013, 5 pages.

Fukushima. "Neocognitron: A self-organizing neural network model for a mechanism of pattern recognition unaffected by shift in position," Biological Cybernetics vol. 36, 1980, 10 pages.

Guo et al. "Deep learning for real-time Atari game play using offline Monte-Carlo tree search planning," NIPS, 2014, 9 pages.

Harmon et al. "Multi-player residual advantage learning with general function approximation," Technical Report WL-TR-1065, Wright-Patterson Air Force Base, 1996, 14 pages.

Harmon et al. "Advantage updating applied to a differential game," In F. Tesauro, D.S. Touretzky and Leen, T.K. (eds.) NIPS, 1995, 8 pages.

LeCun et al. "Deep learning," Nature 521(7553), May 28, 2015, 9 pages.

Levine, et al. "End-to-end training of deep visuomotor policies," arXiv preprint arXiv1504.00702, Apr. 2, 2015, 12 pages.

Lin. "Reinforcement learning for robots using neural networks," PhD thesis, School of Computer Science, Carnegie Mellon University, Jan. 6, 1993, 168 pages.

Maddison et al. "Move Evaluation in Go Using Deep Convolutional Neural Networks," ICLR, Apr. 10, 2015, 8 pages.

Mnih et al. "Human-level control through deep reinforcement learning," Nature, 518, Feb. 26, 2015, 13 pages.

Nair et al. "Massively parallel methods for deep reinforcement learning," ArXiv preprint arXiv1507.04296v2, Jul. 15, 2015, 14 pages.

Schaul et al. "Prioritized experience replay," arXiv preprint arXiv 1511.05952, Feb. 26, 2016, 21 pages.

Schulman et al. "High-dimensional continuous control using generalized advantage estimation," arXiv preprint arXiv1506.02438, Sep. 9, 2016, 14 pages.

Silver et al. "Mastering the game of go with deep neural networks and tree search," Nature 529.7587, Jan. 28, 2016, 20 pages.

Simonyan et al. "Deep inside convolutional networks: Visualizing image classification models and saliency maps," arXiv preprint arXiv1312.6034, Apr. 19, 2014, 8 pages.

Stadie et al. "Incentivizing exploration in reinforcement learning with deep predictive models," arXiv preprint ArXiv1507.00814, Nov. 19, 2015, 11 pages.

Sutton et al. "Policy gradient methods for reinforcement learning with function approximation," NIPS Nov. 29, 1999, 7 pages.

Van Hasselt. "Double Q-learning," NIPS, 2010, 9 pages.

Van Hasselt et al. "Deep reinforcement learning with double Q-learning," arXiv preprint arXiv1509.06461, Dec. 8, 2015, 13 pages.

Van Seijen et al. "A theoretical and empirical analysis of Expected Sarsa," IEEE Symposium on Adaptive Dynamic Programming and Reinforcement Learning, Mar. 30, 2009, 8 pages.

Watter et al. "Embed to control: A locally linear latent dynamics model for control from raw images," NIPS 2015, 9 pages.

EP Office Action in European Appln. No. 16809575.0-1221, dated Aug. 6, 2019, 8 pages.

* cited by examiner

DUELING DEEP NEURAL NETWORKS

CROSS-REFERENCE TO RELATED APPLICATIONS

This application claims the benefit under 35 U.S.C. § 119(e) of U.S. Patent Application No. 62/254,684, entitled "DUELING DEEP NEURAL NETWORKS," filed Nov. 12, 2015. The disclosure of the foregoing application is incorporated herein by reference in its entirety for all purposes.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in systems for selecting actions from a set of actions to be performed by an agent interacting with an environment, where the systems include a dueling deep neural network implemented by one or more computers.

The dueling deep neural network includes: (i) a value subnetwork configured to receive a representation of an observation characterizing a current state of the environment and process the representation of the observation to generate a value estimate, the value estimate being an estimate of an expected return resulting from the environment being in the current state; (ii) an advantage subnetwork configured to receive the representation of the observation and process the representation of the observation to generate a respective advantage estimate for each action in the set of actions that is an estimate of a relative measure of the return resulting from the agent performing the action when the environment is in the current state relative to the return resulting from the agent performing other actions when the environment is in the current state; and (iii) a combining layer configured to, for each action, combine the value estimate and the respective advantage estimate for the action to generate a respective Q value for the action, wherein the respective Q value is an estimate of an expected return resulting from the agent performing the action when the environment is in the current state.

Other embodiments of this aspect include methods for using the systems to select actions to be performed by an agent interacting with an environment. Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

In some implementations, the system comprises one or more second computers and one or more storage devices storing instructions that when executed by the one or second more computers cause the one or more second computers to perform operations including selecting an action to be performed by the agent in response to the observation using the respective Q values for the actions in the set of actions.

In some implementations, the dueling deep neural network further includes one or more initial neural network layers configured to receive the observation and process the observation to generate the representation of the observation.

In some implementations, the observation is an image and the one or more initial neural network layers are convolutional neural network layers. In some implementations, the representation of the observation is the observation.

In some implementations, combining the value estimate and the respective advantage estimate includes determining a measure of central tendency of the respective advantage estimates for the actions in the set of actions; determining a respective adjusted advantage estimate for the action by adjusting the respective advantage estimate for the action using the measure of central tendency; and combining the respective advantage estimate for the action and the value estimate to determine the respective Q value for the action.

In some implementations, the value subnetwork has a first set of parameters and the advantage subnetwork has a second, different set of parameters.

In some implementations, selecting an action to be performed by the agent in response to the observation using the respective Q values for the actions in the set of actions includes selecting an action having a highest Q value as the action to be performed by the agent.

In some implementations, selecting an action to be performed by the agent in response to the observation using the respective Q values for the actions in the set of actions includes selecting a random action from the set of actions with probability $\varepsilon$ and selecting an action having a highest Q value with probability $1-\varepsilon$.

Another innovative aspect of the subject matter disclosed in this specification can be embodied in methods for selecting actions from a set of actions to be performed by an agent interacting with an environment using a dueling deep neural network comprising a value subnetwork and an advantage subnetwork, where the methods includes the actions of obtaining a representation of an observation characterizing a current state of the environment; processing the representation of the observation using the value subnetwork, wherein the value subnetwork is configured to receive the representation of the observation and process the representation of the observation to generate a value estimate, the value estimate being an estimate of an expected return resulting from the environment being in the current state; processing the representation of the observation using the advantage subnetwork, wherein the advantage subnetwork is configured to receive the representation of the observation and process the representation of the observation to generate a respective advantage estimate for each action in the set of actions that is an estimate of a relative measure of the return resulting from the agent performing the action when the environment is in the current state relative to the return resulting from the agent performing other actions when the environment is in the current state; for each action, combining the value estimate and the respective advantage estimate for the action to generate a respective Q value for the action, wherein the respective Q value is an estimate of an expected return resulting from the agent performing the action when the environment is in the current state; and selecting an action to be performed by the agent in response to the observation using the respective Q values for the actions in the set of actions.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

In some implementations, the dueling deep neural network further includes one or more initial neural network layers, and the methods further include processing the observation using the one or more initial neural network layers, wherein the one or more initial neural network layers are configured to receive the observation and process the observation to generate the representation of the observation.

In some implementations, the observation is an image and wherein the one or more initial neural network layers are convolutional neural network layers. In some implementations, the representation of the observation is the observation.

In some implementations, combining the value estimate and the respective advantage estimate includes: determining a measure of central tendency of the respective advantage estimates for the actions in the set of actions; determining a respective adjusted advantage estimate for the action by adjusting the respective advantage estimate for the action using the measure of central tendency; and combining the respective advantage estimate for the action and the value estimate to determine the respective Q value for the action.

In some implementations, the value subnetwork has a first set of parameters and the advantage subnetwork has a second, different set of parameters.

In some implementations, selecting an action to be performed by the agent in response to the observation using the respective Q values for the actions in the set of actions includes selecting an action having a highest Q value as the action to be performed by the agent.

In some implementations, selecting an action to be performed by the agent in response to the observation using the respective Q values for the actions in the set of actions includes selecting a random action from the set of actions with probability $\varepsilon$ and selecting an action having a highest Q value with probability $1-\varepsilon$.

The subject matter described in this specification can be implemented in particular embodiments so as to realize one or more of the following advantages. Neural networks can be trained to generate better advantage estimates. Training a neural network to generate reliable advantage estimates can be computationally more complex than training a neural network to generate reliable value estimates. This is because advantage estimates have to take into account the properties both of the state of an agent's environment and the advantage of each individual action in that state, while value estimates are based on properties of the environment state alone. Allocating a separate subnetwork for generating advantage estimates enables generalized training of neural networks for generating advantage estimates across different actions without the need to change the underlying reinforcement learning algorithm. This leads to the generation of advantage estimates and Q values that are more accurate and mitigates or overcomes the difficulties in generating reliable advantage estimates detailed above. The improved accuracy of generated Q values can be especially significant in cases in which the target values for advantage estimates and Q values of different actions are close to each other.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment. In order for the agent to interact with the environment, the system receives data characterizing the current state of the environment and selects an action from a predetermined set of actions to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

For instance, the agent may be a robotic agent interacting with an environment. Observations about this environment may include sensory data (including images) captured by one or more sensors of the robotic agent and characterizing one or more properties of the environment. For example, each observation may include an image captured by a camera of the robotic agent and, optionally, one or more other sensor readings captured by one or more other sensors of the robotic agent (such as thermal sensors, chemical sensors, motion sensors, etc.).

Figure 1:
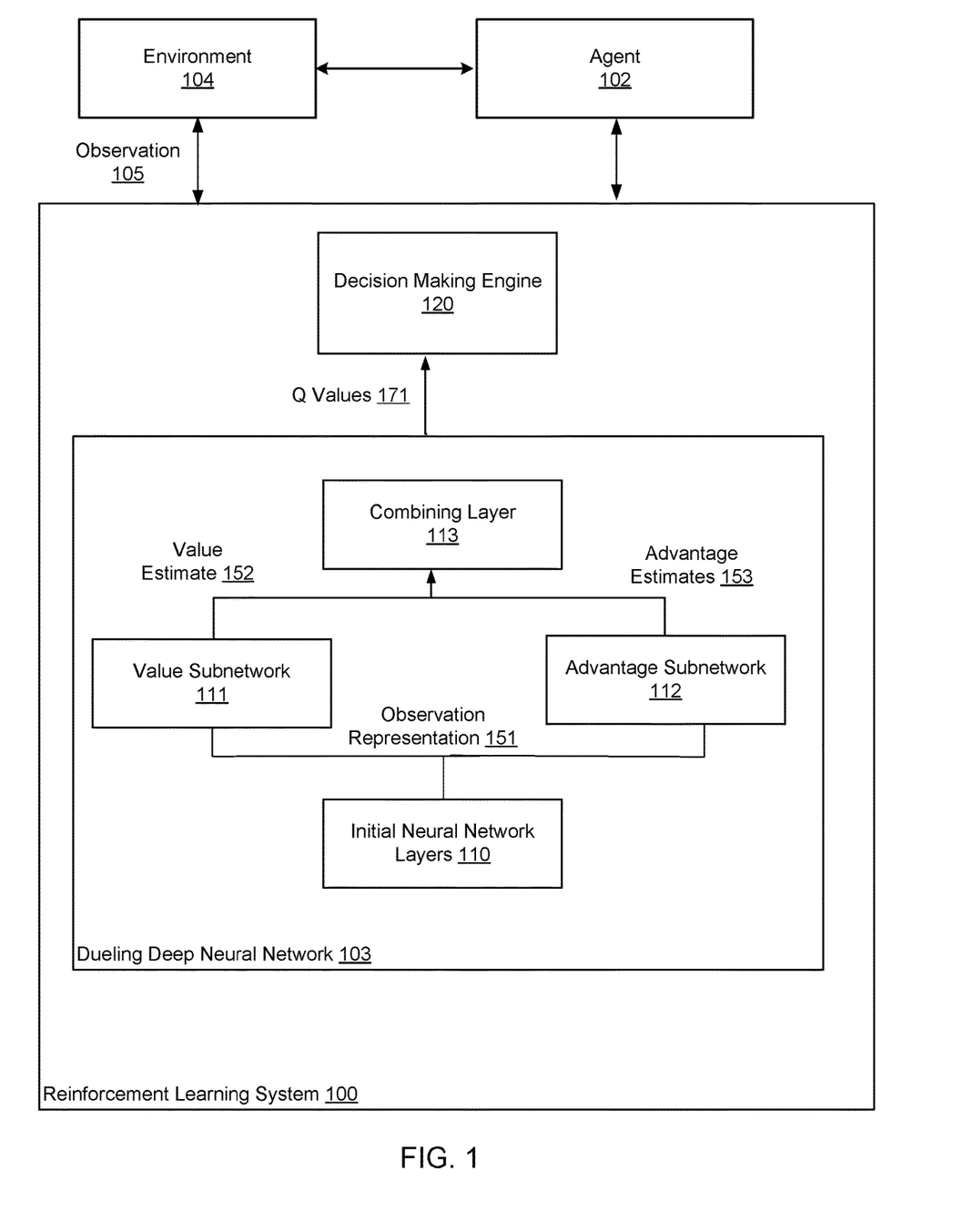
FIG. 1 shows an example reinforcement learning system.

FIG. 1 shows an example reinforcement learning system 100. The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from a predetermined set of actions to be performed by the reinforcement learning agent 102 in response to the observation. In response to some or all of the actions performed by the agent 102, the reinforcement learning system 100 receives a reward. Each reward is a numeric value received from the environment 104 as a consequence of the agent performing an action, i.e., the reward will be different depending on the state that the environment 104 transitions into as a result of the agent 102 performing the action.

In particular, the reinforcement learning system 100 selects actions to be performed by the agent 102 using a dueling deep neural network 103. The dueling deep neural network 103 is a neural network that receives as an input an observation 105 that characterizes the current state of the environment 104 and generates a respective Q value 171 for each action in the set of actions.

The Q value for a given action is an estimate of the expected return resulting from the agent 102 performing the given action in response to the observation 105. The return is a measure of the total long-term future reward received by the reinforcement learning system 100 as a result of the agent performing the action in response to the observation 105. For example, the return may be a time-discounted sum of future rewards.

The dueling deep neural network 103 includes a value subnetwork 111, an advantage subnetwork 112, and a combining layer 113. The dueling deep neural network 103 may also optionally include initial neural network layers 110.

When included in the dueling deep neural network 103, the initial neural network layers 110 are configured to receive the observation 105 and to process the observation 105 to generate a representation 151 of the observation 105. For example, in implementations when the observation is an image, the one or more initial neural network layers 110 may be convolutional neural network layers that extract features from the image.

The value subnetwork 111 is configured to process the representation 151 or, in implementations where the dueling deep neural network 103 does not include any initial neural network layers 100, the observation 105 to determine a value estimate 152 for the current state of the environment 104. The value estimate 152 for the current state is an estimate of the expected return resulting from the environment being in the current state. In other words, the value estimate 152 measures the importance of being in the current state irrespective of the action selected when the environment 104 is in the current state.

The advantage subnetwork 112 is configured to process the representation 151 or, in implementations where the dueling deep neural network 103 does not include any initial neural network layers 100, the observation 105 to determine a respective advantage estimate 153 for each action in the set of actions. The advantage estimate 153 for a given action is an estimate of the relative measure of the return resulting from the agent performing the given action relative to other actions in the set of actions 106 when the environment 104 is in the current state.

The combining layer 113 is configured to, for each action in the set of actions, combine the value estimate 152 and the advantage estimate 153 for the action to determine a respective Q value 171 for the action. Combining the value estimate 152 and advantage estimate 153 for each action is described in greater detail below with reference to FIG. 3.

The reinforcement learning system 100 may optionally include a decision making engine 120. The decision making engine 120 uses the Q values 171 for the actions in the set of possible actions 106 to select an action to be performed by the agent 102 in response to the observation 105 and causes the agent 102 to perform the selected action.

The dueling deep neural network 103 is implemented by one or more first computers, while the operations for the decision making engine 120 are performed by one or more second computers.

In some implementations, the one or more first computers may be part of the same computer system as the one or more second computers. In other implementations, the one or more first computers and the one or more second computers may be part of different computer systems.

In some implementations, the one or more first computers and the one or more second computers consist of the same one or more computers. In other words, the same one or more computers implement the dueling deep neural network 103 and perform the operations for the decision making engine 120.

In some implementations, the one or more first computers and the one or more second computers consist of different one or more computers. In other words, different one or more computers implement the dueling deep neural network 103 and perform the operations for the decision making engine 120.

Figure 2:
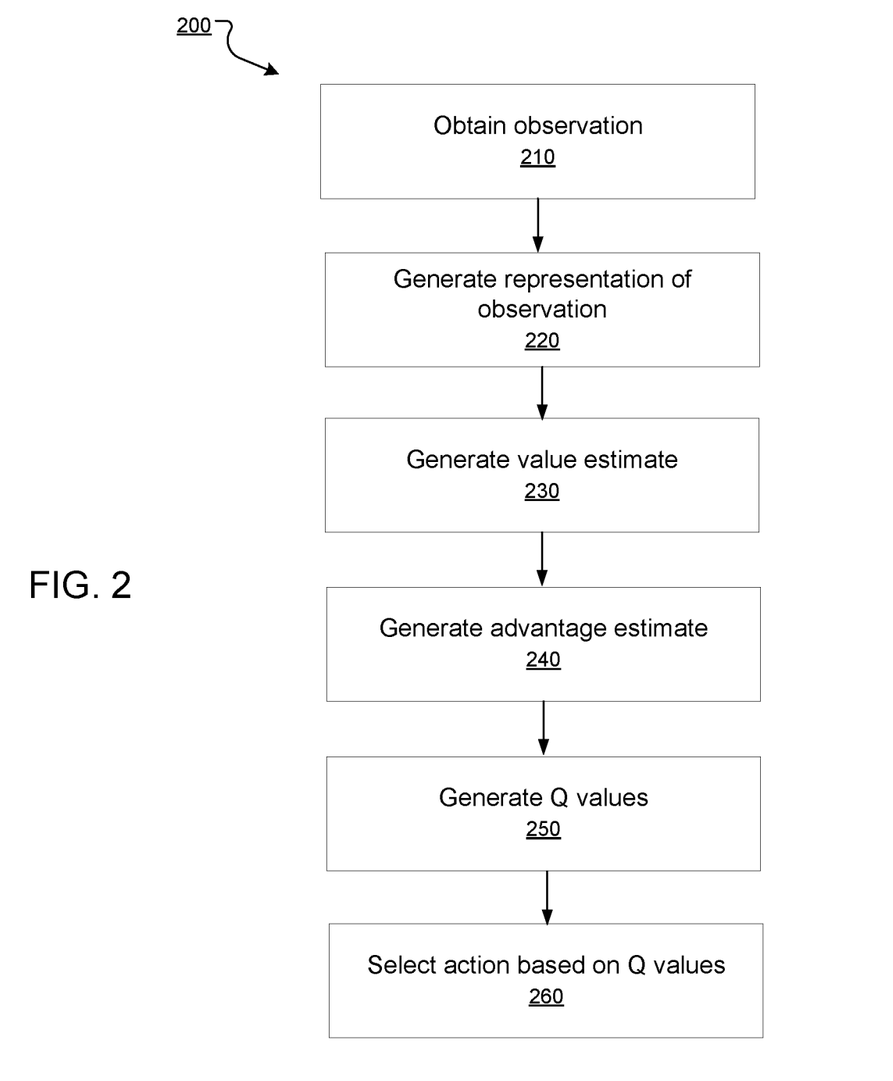
FIG. 2 is a flow chart of an example process for selecting an action to be performed by an agent.

FIG. 2 is a flow chart of an example process 200 for selecting an action to be performed by an agent. For convenience, the process 200 will be described as being performed by a system of one or more computers located in one or more locations. For example, a reinforcing learning system, e.g., the reinforcing learning system 100 of FIG. 1, appropriately programmed in accordance with this specification, can perform the process 200.

The system obtains an observation characterizing the current state of the environment (210). In some implementations, the observation is an image or a collection of images. For example, the observation may be obtained using one or more sensors associated with the environment or with the agent.

The system generates a representation of the observation (220). In some implementations, the representation of the observation is the observation itself. In some other implementations, the system generates the representation of the observation by processing the observation through one or more initial neural network layers of a dueling deep neural network (e.g., the initial neural network layers 110 of the dueling deep neural network 103 in FIG. 1).

The system generates a value estimate by processing the representation of the observation (230 using a value subnetwork of a dueling deep neural network (e.g., the value subnetwork 111 of the dueling deep neural network 103 in FIG. 1). The value estimate is an estimate of an expected return resulting from the environment of the agent being in the current state. In some implementations, the value estimate of a particular state is the expected return when starting in the particular state and following a particular policy thereafter, i.e., an action selection policy defined by the Q values output by dueling deep network.

The system generates an advantage estimate for each action in the possible set of actions by processing the representation of the observation (240) using an advantage subnetwork of a dueling deep neural network (e.g., the advantage subnetwork 112 of the dueling deep neural network 103 in FIG. 1). The advantage estimate for a given action is an estimate of the relative measure of the return resulting from the agent performing the action relative to other actions in the set of actions when the environment is in a current state.

The system generates Q values for each action by combining a measure of the value estimate and a measure of the advantage estimate of the action (250). In some implementations, the system adds the value estimate and the advantage estimate of an action to generate the Q value of an action. In some other implementations, the system adds the value estimate and an adjusted value of the advantage estimate to generate the Q value of an action.

Generating Q values using adjusted advantage estimates is described in greater detail below with reference to FIG. 3.

The system selects an action to be performed by the agent in response to the observation (260).

In some implementations, the system selects an action having a highest Q value as the action to be performed by the agent. In some other implementations, e.g., during the training of the dueling deep neural network, the system selects a random action from the set of possible actions with probability $\epsilon$ and selects an action with the highest Q value with probability $1-\epsilon$. In some of these implementations, the value of $\epsilon$ may decrease as the system is presented with more training examples, which leads to reduced random action selection by the system.

In some implementations, after the dueling deep neural network has been trained, the system selects the action to be performed using the advantage estimate of each action, i.e., by selecting the action that has the highest advantage estimate.

Figure 3:
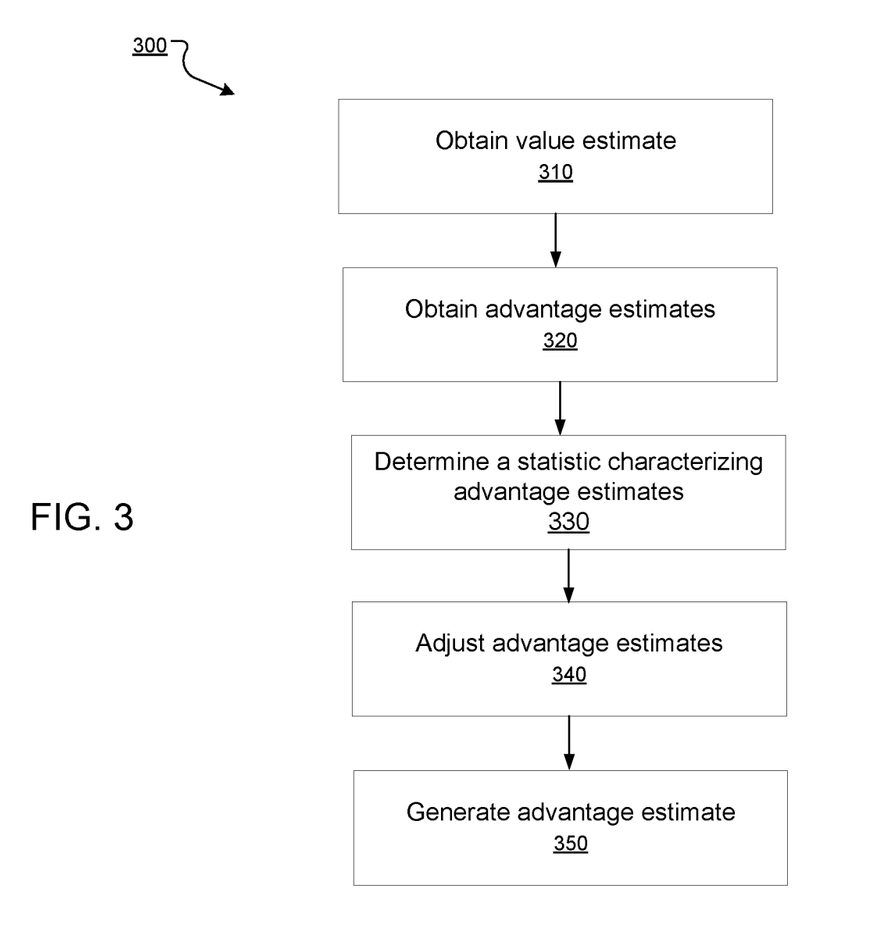
FIG. 3 is a flow chart of an example process for generating Q values using adjusted advantage estimates.

FIG. 3 is a flow chart of an example process 300 for generating Q values using adjusted advantage estimates. For convenience, the process 300 will be described as being performed by a system of one or more computers located in one or more locations. For example, a reinforcing learning system, e.g., the reinforcing learning system 100 of FIG. 1, appropriately programmed in accordance with this specification, can perform the process 300.

The system obtains a value estimate for the current state (310).

The system obtains a respective advantage estimate for each action in the set of possible actions (320).

The system determines a statistic characterizing the advantage estimates (330). In some implementations, the statistic is a measure of central tendency, e.g., the mean or median of the respective advantage estimates. In some other implementations, the statistic is the maximum of the advantage estimates.

The system determines an adjusted advantage estimate using the statistic (340). In some implementations, the system subtracts the statistic from the advantage estimate for each action to determine the adjusted advantage estimate for the action.

The system generates Q values for each action using the value estimate and the respective advantage estimate (350). That is, the system combines the value estimate for the current state and the adjusted advantage estimate for each action to generate the Q value for each action.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for selecting actions from a set of actions to be performed by an agent interacting with an environment, the system comprising:
   a dueling deep neural network implemented by one or more computers, the dueling deep neural network comprising:
   a value subnetwork configured to:
   receive a representation of an observation characterizing a current state of the environment; and
   process the representation of the observation to generate a value estimate of the current state, the value estimate being an estimate of an expected return resulting from the environment being in the current state, independent of the action selected;
   an advantage subnetwork configured to:
   receive the representation of the observation;

receive data identifying the set of actions that can be performed by the agent in response to the observation; and for each particular action in the set of actions, process the representation of the observation and the particular action to generate a respective advantage estimate for the particular action that characterizes a difference in (i) a return that would be received if the agent performed the particular action when the environment is in the current state and (ii) a return that would be received if the agent performed another action from the set of actions when the environment is in the current state; and a combining layer configured to, for each action in the set of actions, process the value estimate and the respective advantage estimate for the action to generate a respective Q value for the current state and the action, wherein the respective Q value is an estimate of an expected return resulting from the agent performing the action when the environment is in the current state.

2. The system of claim 1, wherein the system comprises one or more second computers and one or more storage devices storing instructions that when executed by the one or second more computers cause the one or more second computers to perform operations comprising:

selecting an action to be performed by the agent in response to the observation using the respective Q values for the current state and the actions in the set of actions.

3. The system of claim 1, wherein the dueling deep neural network further comprises:

one or more initial neural network layers configured to:
receive the observation; and
process the observation to generate the representation of the observation.

4. The system of claim 3, wherein the observation is an image and wherein the one or more initial neural network layers are convolutional neural network layers.

5. The system of claim 1, wherein the representation of the observation is the observation.

6. The system of claim 1, wherein combining the value estimate and the respective advantage estimate comprises:

determining a measure of central tendency of the respective advantage estimates for the actions in the set of actions;

determining a respective adjusted advantage estimate for the action by adjusting the respective advantage estimate for the action using the measure of central tendency; and combining the respective advantage estimate for the action and the value estimate to determine the respective Q value for the action.

7. The system of claim 1, wherein the value subnetwork has a first set of parameters and the advantage subnetwork has a second, different set of parameters.

8. The system of claim 2, wherein selecting an action to be performed by the agent in response to the observation using the respective Q values for the actions in the set of actions comprises:

selecting an action having a highest Q value as the action to be performed by the agent.

9. The system of claim 2, wherein selecting an action to be performed by the agent in response to the observation using the respective Q values for the actions in the set of actions comprises:

selecting a random action from the set of actions with probability $\varepsilon$; and
selecting an action having a highest Q value with probability $1-\varepsilon$.

10. A method for selecting actions from a set of actions to be performed by an agent interacting with an environment using a dueling deep neural network comprising a value subnetwork and an advantage subnetwork, the method comprising:

obtaining a representation of an observation characterizing a current state of the environment;

processing the representation of the observation using the value subnetwork, wherein the value subnetwork is configured to:
receive the representation of the observation; and
process the representation of the observation to generate a value estimate of the current state, the value estimate being an estimate of an expected return resulting from the environment being in the current state, independent of the action selected;

processing the representation of the observation using the advantage subnetwork, wherein the advantage subnetwork is configured to:
receive the representation of the observation;
receive data identifying the set of actions that can be performed by the agent in response to the observation; and
for each particular action in the set of actions, process the representation of the observation and the particular action to generate a respective advantage estimate for the particular action that characterizes a difference in (i) a return that would be received if the agent performed the particular action when the environment is in the current state and (ii) a return that would be received if the agent performed another action from the set of actions when the environment is in the current state; and for each action in the set of actions, processing the value estimate and the respective advantage estimate for the action to generate a respective Q value for the current state and the action, wherein the respective Q value is an estimate of an expected return resulting from the agent performing the action when the environment is in the current state; and selecting an action to be performed by the agent in response to the observation using the respective Q values for the actions in the set of actions.

11. The method of claim 10, wherein the dueling deep neural network further comprises one or more initial neural network layers, and wherein the method further comprises:

processing the observation using the one or more initial neural network layers, wherein the one or more initial neural network layers are configured to:
receive the observation; and
process the observation to generate the representation of the observation.

12. The method of claim 11, wherein the observation is an image and wherein the one or more initial neural network layers are convolutional neural network layers.

13. The method of claim 10, wherein the representation of the observation is the observation.

14. The method of claim 10, wherein combining the value estimate and the respective advantage estimate comprises:

determining a measure of central tendency of the respective advantage estimates for the actions in the set of actions;

determining a respective adjusted advantage estimate for the action by adjusting the respective advantage estimate for the action using the measure of central tendency; and combining the respective advantage estimate for the action and the value estimate to determine the respective Q value for the action.

15. The method of claim 10, wherein the value subnetwork has a first set of parameters and the advantage subnetwork has a second, different set of parameters.

16. The method of claim 10, wherein selecting an action to be performed by the agent in response to the observation using the respective Q values for the actions in the set of actions comprises:

selecting an action having a highest Q value as the action to be performed by the agent.

17. The method of claim 10, wherein selecting an action to be performed by the agent in response to the observation using the respective Q values for the actions in the set of actions comprises:

selecting a random action from the set of actions with probability $\varepsilon$; and selecting an action having a highest Q value with probability $1-\varepsilon$.

18. A computer storage medium encoded with instructions that, when executed by one or more computers, cause the one or more computers to perform operations for a method for selecting actions from a set of actions to be performed by an agent interacting with an environment using a dueling deep neural network comprising a value subnetwork and an advantage subnetwork, the method comprising:

obtaining a representation of an observation characterizing a current state of the environment;

processing the representation of the observation using the value subnetwork, wherein the value subnetwork is configured to:

receive the representation of the observation; and process the representation of the observation to generate a value estimate of the current state, the value estimate being an estimate of an expected return resulting from the environment being in the current state, independent of the action selected;

processing the representation of the observation using the advantage subnetwork, wherein the advantage subnetwork is configured to:

receive the representation of the observation;

receive data identifying the set of actions that can be performed by the agent in response to the observation; and for each particular action in the set of actions, process the representation of the observation and the particular action to generate a respective advantage estimate for the particular action that characterizes a difference in (i) a return that would be received if the agent performed the particular action when the environment is in the current state and (ii) a return that would be received if the agent performed another action from the set of actions when the environment is in the current state; and for each action in the set of actions, combining processing the value estimate and the respective advantage estimate for the action to generate a respective Q value for the current state and the action, wherein the respective Q value is an estimate of an expected return resulting from the agent performing the action when the environment is in the current state; and selecting an action to be performed by the agent in response to the observation using the respective Q values for the actions in the set of actions.

19. The computer storage medium of claim 18, wherein the dueling deep neural network further comprises one or more initial neural network layers, and wherein the method further comprises:

processing the observation using the one or more initial neural network layers, wherein the one or more initial neural network layers are configured to:

receive the observation; and process the observation to generate the representation of the observation.

20. The computer storage medium of claim 18, wherein combining the value estimate and the respective advantage estimate comprises:

determining a measure of central tendency of the respective advantage estimates for the actions in the set of actions;

determining a respective adjusted advantage estimate for the action by adjusting the respective advantage estimate for the action using the measure of central tendency; and combining the respective advantage estimate for the action and the value estimate to determine the respective Q value for the action.

* * * * *